United States Patent [19]
Jackson et al.

[11] Patent Number: 5,307,995
[45] Date of Patent: May 3, 1994

[54] LAWN AND GARDEN SPRAYER WITH HOSE COMPRESSION CONNECTOR

[75] Inventors: Gregory D. Jackson, Zeeland; Alan J. Krebs, Howard City, both of Mich.

[73] Assignee: RL Corporation, Lowell, Mich.

[21] Appl. No.: 105,711

[22] Filed: Aug. 12, 1993

[51] Int. Cl.5 ............................. B05B 9/04
[52] U.S. Cl. .................. 239/373; 239/530; 239/588; 239/600; 285/247
[58] Field of Search ............. 239/373, 530, 588, 600; 222/401; 285/247, 192

[56] References Cited

U.S. PATENT DOCUMENTS

| | | |
|---|---|---|
| 166,177 | 7/1875 | Work . |
| 184,639 | 11/1876 | Loring . |
| 787,529 | 4/1905 | Muehlberg . |
| 1,267,335 | 5/1918 | Porter . |
| 1,726,238 | 8/1929 | Pipher . |
| 2,529,645 | 11/1950 | Winks et al. ............ 222/401 X |
| 3,704,704 | 12/1972 | Gonzales . |
| 4,102,500 | 7/1978 | Luff . |
| 4,350,299 | 9/1982 | Stephenson et al. ........ 239/588 X |
| 4,785,517 | 11/1988 | Takano . |
| 4,919,311 | 4/1990 | Born ................... 222/401 |
| 5,072,884 | 12/1991 | Ellison et al. ............ 222/401 X |
| 5,143,299 | 9/1992 | Simonetti et al. . |

FOREIGN PATENT DOCUMENTS

| | | | |
|---|---|---|---|
| 573685 | 4/1933 | Fed. Rep. of Germany ...... 285/247 |
| 348562 | 2/1905 | France . |
| 546525 | 11/1922 | France . |
| 1208594 | 2/1960 | France . |
| 1497594 | 10/1967 | France . |
| 121314 | 12/1918 | United Kingdom . |
| 356646 | 10/1961 | Switzerland ................. 285/247 |

*Primary Examiner*—Andres Kashnikow
*Assistant Examiner*—William Grant
*Attorney, Agent, or Firm*—Price, Heneveld, Cooper, DeWitt & Litton

[57] ABSTRACT

The specification discloses a lawn and garden sprayer having a hose compression connector for coupling a dispensing hose to a supply tube inside the liquid-containing dispensing tank. The hose compression connector comprises a threaded boss projecting from the dispensing tank, a hose adapter having a raised annular shoulder, over which the dispensing hose extends, located at the dispensing-hose receiving end thereof, and a threaded nut having a knurled exterior for easy gripping and an interior, annular compression surface, whereby the hose is clamped between the compression nut and the upper annular surface of the shoulder, and between the boss and the lower surface of the shoulder.

6 Claims, 2 Drawing Sheets

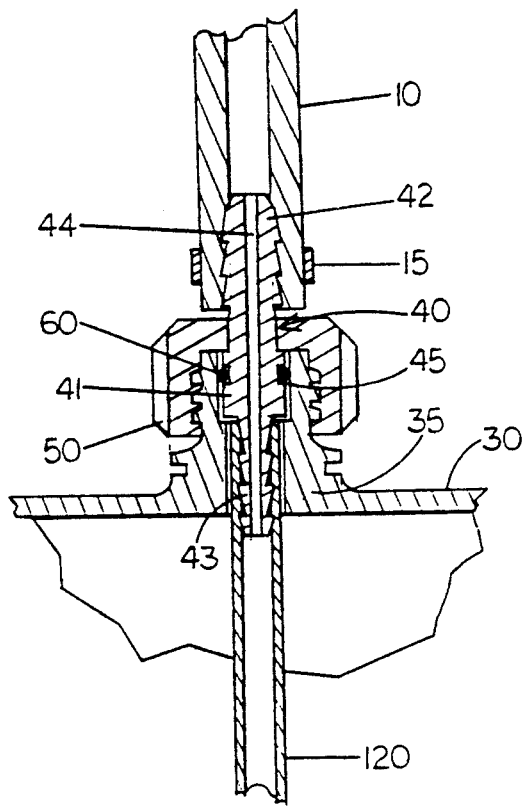
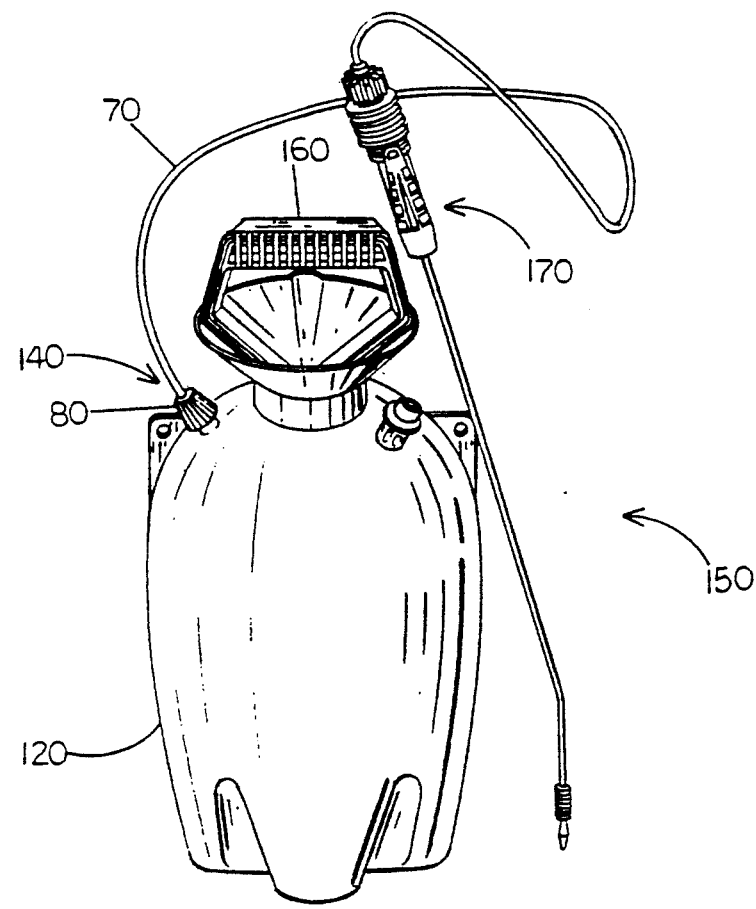
PRIOR ART
FIG. 1
FIG. 2

LAWN AND GARDEN SPRAYER WITH HOSE COMPRESSION CONNECTOR

BACKGROUND OF THE INVENTION

The present invention relates to lawn and garden sprayers and, more particularly, to a coupling device for connecting the hose and sprayer assembly to a dispensing tank.

The typical lawn and garden sprayer includes a liquid-dispensing tank connected, by means of a length of flexible hose, to a spray wand/nozzle having a shut-off valve. The dispensing tank also includes a means for pressurizing its liquid contents, being typified by a hand-operated pump assembly or a "quick-disconnect" hose coupling permitting pressurization by water (U.S. Pat. No. 4,782,982). As shown in FIG. 1 (prior art), a common device for connecting dispensing hose 10 to a supply tube 20 comprises a hose adapter 40, having opposing, barbed projections 42 and 43, an integral, threaded boss 36, a threaded retainer nut 52, and a metal clamp band 15. Supply tube 20 is placed over barbed projection 43 of hose adapter 40, which rests in a threaded boss 35. The central portion 41 of hose adapter 40 is slightly larger than the opening in threaded boss 35 which accepts barbed projection 43 and the attached supply tube 20, such that the hose adapter 40 does not fall into the dispensing tank 30. Retainer nut 50 is placed over barbed projection 42, and then threaded onto threaded boss 35, such that hose adapter 40 cannot be pulled upward and out of threaded boss 35. Again, this is accomplished by the fact that the central portion 41 of hose adapter 40 is slightly larger than the opening in retainer nut 50 which passes over barbed projection 42. Dispensing hose 10 is then fitted over barbed projection 42, metal clamp band 15 being securely fastened to the exterior circumference of dispensing hose 10 immediately adjacent to barbed projection 42. In this fashion, the combined actions of barbed projection 42 and metal clamp band 15 prevent dispensing hose 10 from being pulled away from barbed projection 42 while one is operating the sprayer unit.

As depicted, the hose adapter 40 includes a channel 44, running from the tip of barbed projection 43 to the tip of barbed projection 42, such that the liquid in tank 30 can pass from supply tube 20 to dispensing hose 10. Further, the central portion 41 of hose adapter 40 includes an annular groove 45 for accepting a rubber "O"-ring 60 necessary for preventing the seepage of liquid around the central portion 41 of hose adapter 40.

Unfortunately, this common method disclosed by the prior art has several problems. First, it is expensive to assemble. Second, as a person operates such a sprayer, the dispensing hose is pulled, bent, and twisted on the barbed projection 42 of the hose adapter 40 (FIG. 1). These forces have a tendency to pull the dispensing hose 10 away from the barbed projection 42, even in the presence of a metal clamp band 15. This problem is especially prevalent where the sprayer is handled roughly or used for a prolonged period of time. Another problem generated by these forces is breakage of the barbed projection 42, especially where the retainer nut 50 presents a sharp right angle to the portion of the barbed projection 42 which it abuts, while providing no other lateral support beyond that point.

SUMMARY OF THE INVENTION

In the hose compression connector of the present invention, a hose adapter having a raised annular shoulder is forced into the end of a dispensing hose, such that the semi-flexible hose is forced around the annular shoulder. The hose adapter rests in a boss, threaded to accept a knurled compression nut, which projects from a liquid-dispensing tank. The compression nut includes an annular compression surface which, when threaded onto a boss, embraces a portion of the dispensing hose at an exterior portion of the bulge in the dispensing hose created by the insertion of the hose adapter, such that the hose cannot be pulled away from the integral boss. The nut also forces the hose covered bottom surface of the annular ridge into engagement with a portion of the integral boss which clamps that portion of the hose against the shoulder, helping further to prevent the dispensing hose from being pulled out of the boss.

The use of a compression nut in conjunction with a hose adapter having a raised annular shoulder prevents dispensing hose detachment or adapter breakage by the so-called toggling forces. Further, the present invention eliminates the need for a metal clamp-band, both reducing cost of manufacture and simplifying assembly.

These and other objects, advantages, and features of the invention will be more fully understood and appreciated by reference to the written specification and appended drawings.

BRIEF DESCRIPTION OF THE DRAWINGS

FIG. 1 is a lateral, cross-sectional view of a prior art dispensing-hose connector;

FIG. 2 is a perspective view of the lawn and garden sprayer unit, showing the compression connector of the present invention;

DESCRIPTION OF THE PREFERRED EMBODIMENT

Figure 3:
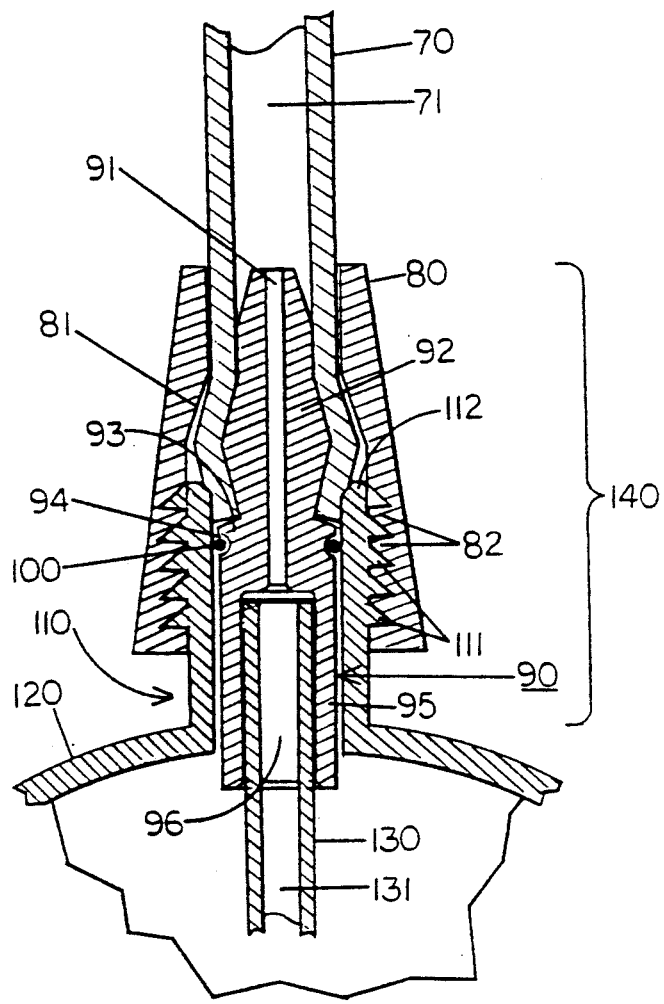
FIG. 3 is a lateral cross-sectional view of the hose compression connector of the present invention.

In the preferred embodiment, lawn and garden sprayer 150 includes a feed tube 130 running into the dispensing tank 120, and coupled to a dispensing hose 70 by adapter 90 (FIGS. 1 and 2). Hose 70 is connected at its opposite end to spray wand/handle assembly 170 (FIG. 1). Adapter 90 is held in threaded boss 110 by compression nut 80 (FIG. 2).

The semi-flexible dispensing hose 70 is forced over hose adapter 90 (FIGS. 3 and 4) having a raised annular shoulder 92 comprised of sloping surfaces which project away from the longitudinal axis of the hose adapter 90 and meet at a point of maximum projection. The leading annular surface 97 of adapter 90 tapers from 0.258 inches diameter to 0.385 inches at shank 98 in order to facilitate sliding hose 70 over adapter 90. The leading surface 92A and trailing surface 92B of raised shoulder 92 slope upwardly to their juncture at an angle of about 15°–20°, each rising for a distance of about 0.28 inches. The diameter of shoulder 92 at its maximum is about 0.552 inches.

Figure 4:
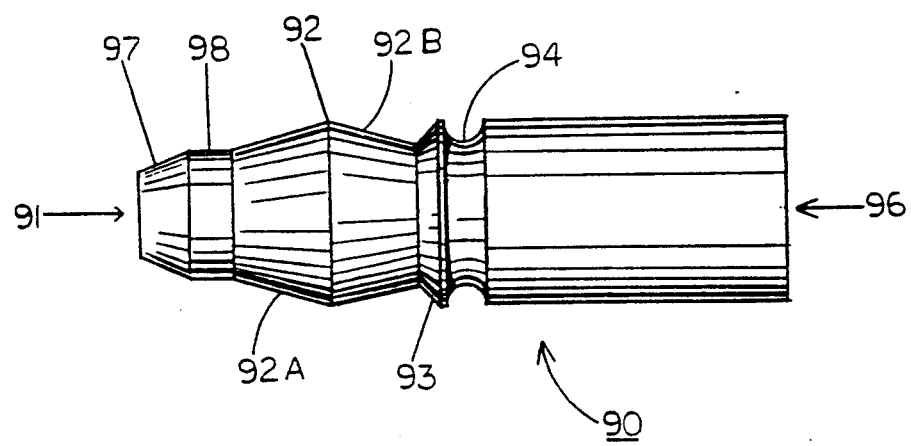
FIG. 4 is a lateral elevation illustrating the hose adapter component of the present invention.

Hose adapter 90 also includes an annular ridge 93, located at the base of raised annular shoulder 92, the upper surface of which serves as a hose stop. Immediately below, and partly defined by, the protrusion of annular ridge 93 is a recessed annular groove 94, designed to accept a rubber "O"-ring 100. As illustrated by FIG. 3, the remaining portion of hose adapter 90 rearward to the annular groove 94 includes a bore 96 for accepting a supply tube 130.

Compression nut 80, preferably constructed of a tough plastic material, includes an annular compression surface 81 and a series of threads 82 for mating with the threaded boss 110. The annular compression surface 81 is generally parallel to and approximately as long as the sloping upper surface of raised annular shoulder 92 of hose adapter 90. The remaining portion of compression nut 80 more proximate integral boss 110 is sufficiently wide to accept and thread snugly onto integral boss 110. As depicted, compression nut 80 has tapered walls reaching a maximum width at the base thereof generally adjacent to threads 82.

Integral with the body of dispensing tank 120 is an outwardly projecting boss 110, having a series of threads 111 located towards its uppermost end. At the outermost portion of boss 110, located just above the series of threads 111, is a beveled inner edge 112 which acts to clamp into the endmost portion of the dispensing hose 70 against the lower surface of shoulder 92 when compression nut 80 is threaded on boss 110.

Semi-flexible dispensing hose 70 is forced over the raised annular shoulder region 92 of hose adapter 90, such that the dispensing hose 70 both "bulges" around and adopts approximately the same shape as the raised annular shoulder region 92. At the opposing end of hose adapter 90, a supply tube 130 is inserted into bore 96. By any conventional means, such as an adhesive coating on the surface of bore 96, supply tube 130 is permanently affixed to hose adapter 90.

As depicted in FIG. 3, hose adapter 90 includes a channel 91 extending its entire length, permitting fluid communication between supply tube 130 on the one side and dispensing hose 70 on the other side.

Hose adapter 90 rests in projecting boss 110, the bulging portion of dispersing hose 70 abutting annular ridge 93 and preventing the hose adapter 90 from falling into the dispensing tank 120. Rubber "O"-ring 100 provides a water tight junction between hose adapter 90 and projecting boss 110, while also helping to keep hose adapter 90 in place. Compression nut 80, through which dispensing hose 70 is fed prior to being connected to hose adapter 90, is threaded securely onto projecting boss 110 such that annular compression surface 81 traps the bulging portion of dispensing hose 70 between the upper sloping surface of raised annular shoulder 92 and compression surface 81. In addition to the concerted action of compression surface 81 and raised annular shoulder 92 of hose adapter 90, the beveled inner edge 112 of projecting boss 110 clamps dispensing hose 70 against the lower surface of shoulder 92 when compression nut 80 is securely fastened, further preventing dispensing hose 70 from being pulled away from dispensing tank 120.

Annular ridge 93 of hose adapter 90, having a diameter slightly smaller than the interior diameter of threaded boss 110, provides a hose stop which prevents dispensing hose 70 from being pushed into projecting boss 110 any further than is desired.

Of course, it is understood that the foregoing is merely a preferred embodiment of the invention. Various other changes and alterations, apparent to those skilled in the art, can be made without departing from the spirit and broader aspects thereof as set forth in the appended claims, interpreted in accordance with the principles of patent law.

The embodiments of the invention in which an exclusive property or privilege is claimed are defined as follows:

1. A lawn and garden sprayer comprising:
    a dispensing tank for holding the desired liquid to be applied;
    a threaded, projecting boss on said tank, said boss including an opening therethrough which extends from the interior to the exterior of said tank, the outermost end of said boss facing away from said tank;
    a hose adapter, positioned in said boss opening and including an inner end located towards the interior of said tank and an outer end projecting away from said boss, said hose adapter also including a fluid flow passageway extending from one end thereof to the other end;
    a supply tube, mounted on said inner end of said hose adapter and extending into said dispensing tank;
    said hose adapter including an annular, projecting shoulder located generally outward from the outermost end of said threaded boss, said shoulder including outwardly and inwardly facing surfaces which meet at a point of maximum projection from the longitudinal axis of said adapter and recede away from each other back towards said longitudinal axis of said adapter;
    a dispensing hose, extending from said adapter to a spray wand/handle, said dispensing hose extending over said annular shoulder on said adapter such that when assembled, a portion of said hose is clamped between said boss and said inwardly facing surface of said adapter shoulder;
    a threaded retainer nut threaded onto said threaded boss, having an opening through which said dispensing hose passes, and an annular compression surface engaging said dispensing hose and clamping said dispensing hose between said compression surface and said outwardly facing surface of said annular shoulder.

2. The lawn and garden sprayer of claim 1, wherein said outermost end of said projecting, threaded boss has a beveled inner edge, said beveled inner edge comprising that portion of said boss which clamps said portion of said boss against said inwardly facing surface of said annular shoulder.

3. The lawn and garden sprayer of claim 1, wherein said hose adapter has an annular, hose-stopping ridge located below said projecting annular shoulder portion.

4. The lawn and garden sprayer of claim 3, in which said hose-stopping ridge has a diameter of sufficient width to prevent said dispensing hose from being pushed past said hose-stopping ridge.

5. The lawn and garden sprayer of claim 1, in which said hose adapter has an annular groove, located generally inwardly from said raised annular shoulder, for purposes of receiving an "O"-ring seal.

6. The lawn and garden sprayer of claim 1, having a means for pressurizing the liquid contents of said dispensing tank.

* * * * *